United States Patent Office 3,523,960
Patented Aug. 11, 1970

3,523,960
STABILIZATION PROCESS OF METAL ETHYLENE BIS-DITHIOCARBAMATES
Jean Lehureau, Lyon, France, assignor to Progil, Paris, France, a corporation of France
No Drawing. Filed July 30, 1968, Ser. No. 748,621
Claims priority, application France, Aug. 3, 1967, 49,010
Int. Cl. C07j 1/08, 3/06, 13/00
U.S. Cl. 260—429        7 Claims

ABSTRACT OF THE DISCLOSURE

Stable and fire-proof zinc, manganese or iron ethylene bis-dithiocarbamates are made by precipitating cuprous ethylene bis-dithiocarbamate within or onto the metal ethylene bis-dithiocarbamate.

---

The present invention relates to a process for obtaining metal ethylene bis-dithiocarbamates which are fire-proof and stable during storage.

It has been known for a long time that several metal ethylene bis-dithiocarbamates such as those of copper, manganese, zinc, nickel, iron, etc., have interesting fungicidal properties and constitute rubber vulcanization agents.

However most of those water-insoluble metal salts have the great disadvantage of being unstable and especially of being combustible. Thus, for example, zinc ethylene bis-dithiocarbamate, called zinebe, may inflame spontaneously from 100° C., as soon as its water content becomes lower than 0.5%; manganese ethylene bis-dithiocarbamate, called manebe, ignites when the temperature exceeds 50 to 60° C.; iron ethylene bis-dithiocarbamates, which have been often quoted in the form of ferrous or ferric derivatives, are so auto-inflammable that it is not possible to dry them except in an inert gas, such as nitrogen, and, even at 0° C., they inflame spontaneously as soon as they are in the presence of air.

Several adjuvants intended for improving the storage stability of metal alkylene bis-dithiocarbamates have been proposed. As examples are inorganic compounds such as alkali metal sulphites, bisulphites or hyposulphites; organic products such as hexamethylene tetramine; especial earths such as kaolin, diatomite, bentonite and cellite; drying or hygroscopic agents such as calcium and zinc bromides or chlorides; anhydrous sodium or cupric sulphates; silica or alumina gels, etc.

It does not appear that the incorporation of those additives to some metal ethylene bis-dithiocarbamates such as zinebe and especially manebe has given rise to very satisfactory results. Moreover, no stabilizing agent has apparently been proposed in the case of iron ethylene bis-dithiocarbamate, called ferrebe, which constitutes a heavy handicap for this product. The cost price of ferrebe is much lower than that of its better known homologs, such as manebe and zinebe, and yet has a closely related fungicidal activity, which should result in a great industrial development of ferrebe.

It has now been found that the adding of small quantities of cuprous ethylene bis-dithiocarbamate to unstable metal ethylene bis-dithiocarbamates, such as those of manganese, zinc and iron unexpectedly have been found to suppress wholly the auto-inflammability of those salts and to reduce considerably their combustibility.

The utilization of copper compounds together with metal ethylene bis-dithiocarbamate has previously been described. French Pats. 1,137,148, 1,329,079 and 1,363,911 describe the use of copper in the form of oxychloride, acetates, carbonate, hydroxy-carbonate and sulfate salts in physical mixture with the metal thiocarbamate. U.S. Pat. 3,082,299 and French Pat. 1,363,929 show zinc or manganese and copper mixed salts derived from ethylene bis-dithiocarbamic acid. French Pat. 1,352,117 describes salts of copper and manganese ethylene bis-dithiocarbamate.

However, it is very important to note that all copper derivatives used for obtaining the associations known until now have been cupric derivatives and not cuprous compounds as in the present invention. Moreover, it has never been proposed in the prior art to add cuprous compounds, or even cupric ones, to iron ethylene bis-dithiocarbamates, to prevent their auto-inflammability.

Accordingly, the metal ethylene bis-dithiocarbamates stabilized by incorporating cuprous derivatives, according to the present invention, are new industrial compounds. The structure and the conformation of those products will not be described, merely the processes which can be used for obtaining them.

A process for preparing the compounds stabilized according to the present invention consists of precipitating mixed ethylene bis-dithiocarbamates of copper (valence 1) and the desired metal—as for example, iron, zinc or manganese—by interaction between a water-soluble metal ethylene bis-dithiocarbamate, as for example the sodium salt, and a mixture, in aqueous solution of soluble salts of copper (1) and the metal. The reaction takes place, according to the classical techniques, by the simple mixing of the reagents at a temperature of between 10 and 50° C.

It is also possible to introduce an aqueous dispersion or suspension of the insoluble metal dithiocarbamate to be stabilized into a sodium dithiocarbamate aqueous solution and adding simultaneously approximately the stoichiometric quantity of a cuprous salt rendered water—soluble by means of an alkaline or alkaline earth chloride.

According to an especially advantageous variation of the invention, the process consists of precipitating the cuprous ethylene bis-dithiocarbamate directly onto the insoluble metal ethylene bis-dithiocarbamate and of obtaining in this way, manebe, zinebe or ferrebe, the elementary grains of which are coated with a cuprous ethylene bis-dithiocarbamate film. For this, it is sufficient to contact an aqueous dispersion or slurry of insoluble metal ethylene bis-dithiocarbamate with an aqueous solution of soluble dithiocarbamate (for example, sodium dithane) and of a cuprous salt rendered water-soluble as hereinabove described. The sodium dithane-aqueous solution is introduced simultaneously into a reaction vessel, with the insoluble dithiocarbamate aqueous slurry (ferrebe, manebe, etc.) added with the water-soluble cuprous salt. But it is also possible, according to variations of those technics to introduce the sodium dithane directly into the insoluble dithiocarbamate aqueous slurry added with the cuprous compound and placed in the reactor or vice versa. It is also possible to contact sodium dithane and insoluble dithiocarbamate then to incorporate therein the compound of monovalent copper.

The different mixtures are prepared with stirring at ordinary pressure and a temperature of between 10 and 50° C.

As compounds of the monovalent copper, it is possible to use known cuprous halides or salts, such as for example cuprous chloride. As it has been said hereinabove, the cuprous compound is used in a water-soluble form. An easy and well known process to reach this result consists in incorporating (for example in the case of) cuprous chloride in an alkali earth or alkali metal chloride containing for example 50 to 200 g./l. of NaCl or $CaCl_2$.

The respective ratios of the reagents used according to the invention are not critical. For example it is well known that the stoichiometric quantity has to be added, or preferable, a slight excess of metal derivative soluble with regard to sodium dithane, in order to obtain the corresponding metal ethylene bis-dithiocarbamate. Thus in the case according to the first operative mode, indicated hereinabove (interaction) it will be necessary to introduce at least 2 moles of the total of the soluble metal salt (Mn, Zn, Fe, etc.) and of the cuprous salt for 2 moles of sodium dithane. Practically, the term "at least 1 mole" will correspond generally to the range of 1 to 1.05 moles.

On the contrary when the preferred form of the invention is used—that is, in precipitating the cuprous ethylene bis-dithiocarbamate directly into the insoluble metal ethylene bis-dithiocarbamate to be protected, it is generally advantageous to use 0.02 to 0.5 mole, and preferably 0.05 to 0.1 mole of sodium dithane for 1 mole of the metal carbamate. The ratios of cuprous salt/sodium dithane correspond, also in this case, to the stoichiometry, or a light excess of from 0.5 to 5% of cuprous salt, in order to obtain the corresponding cuprous ethylene bis-dithiocarbamate.

In a general way the optimal amounts of metal copper (1) with regard to the weight of the metal of the dithiocarbamate to be protected are between 0.2 and 15%.

The following examples described in an illustrative way, show how the invention may be applied.

EXAMPLE 1

(a) Ferrous ethylene bis-dithiocarbamate was prepared by mixing with stirring, at a temperature from 20 to 25° C., 1 mole of sodium ethylene bis-dithiocarbamate and 0.51 mole of $FeCl_2$, to obtain an aqueous suspension containing 10% of the desired ferrous compound. After filtration and water-washing of the reaction mass and drying on a drum, a product was obtained which inflamed spontaneously in air, even with a residual water percentage of 10%.

(b) Working under the same conditions as hereinabove, but during the ferrous ethylene bis-dithiocarbamate synthesis, a solution of CuCl in an aqueous solution containing 150 g./l. of NaCl in such a quantity as there is 10% (by weight) of metal copper with regard to the metal iron was added. A product was obtained which, after complete drying to anhydrous state was not self-inflammable at room temperature. Moreover, this same product was revealed to be practically self-extinguishable when voluntarily fired.

EXAMPLE 2

(a) Manganese ethylene bis-dithiocarbamate (manebe) was obtained according to the same well known technics as Example 1(a) by mixing with stirring 1 mole of sodium dithane and 0.51 mole of $MnCl_2$. After filtration, washing and drying the obtained manebe was self-inflammable at a temperature of 60° C. as soon as the residual moisture content of the product became lower than 1% or equal to it.

(b) The manebe was coated with cuprous ethylene bis-dithiocarbamate, under the following conditions. In a vessel containing an aqueous slurry which comprised 1.4 moles of manebe, there was introduced, with stirring at room temperature and at a pH of between 3.5 and 7, an aqueous solution of sodium ethylene bis-dithiocarbamate containing 0.1 mole of dry product, together with an aqueous solution of CuCl in NaCl containing 0.105 moles of CuCl.

After filtration of the obtained reaction slurry, it was water-washed and dried on a drum. The obtained product remained non-self-inflammable up to the temperature of 100° C. in zones of residual water percentage from 0 to 1% (by weight). Moreover it was self-extinguishable and non-inflammable.

A percentage of copper (1) with regard to metal manganese as low as about 4% by weight is sufficient to suppress wholly manebe self-inflammation and to make it fireproof.

What is claimed is:

1. A process for modifying metal ethylene bis-dithiocarbamates, said metal being selected from the group consisting of zinc, manganese and iron, to render them fireproof and stable during storage comprising co-precipitating cuprous ethylene bis-dithiocarbamate and the metal ethylene bis-dithiocarbamate to be protected by reaction between a mixture of water soluble salts of copper of valence 1 and of the metal and an aqueous solution of sodium ethylene bis-dithiocarbamate.

2. A process for modifying metal ethylene bis-dithiocarbamates, said metal being selected from the group consisting of zinc, manganese and iron, to render them fireproof and stable during storage comprising coating cuprous ethylene bis-dithiocarbamate on the metal ethylene bis-dithiocarbamate by contacting sodium ethylene bis-dithiocarbamate and a water soluble cuprous derivative with an aqueous suspension of the metal ethylene bis-dithiocarbamate to be protected, the reaction taking place at a temperature of 10–50° C. and followed by filtration; water washing and then drying.

3. A process according to claim 1 wherein the monovalent copper salt is a halide in a solution of an alkali earth or alkali metal chloride.

4. A process according to claim 2 wherein the cuprous derivative is a halide in a solution of an alkali earth or alkali metal chloride.

5. A process according to claim 1 wherein the weight ratio of copper of valence 1 to the metal of the dithiocarbamate to be stabilized is 0.2–15%.

6. A process according to claim 2 wherein the weight ratio of copper valence 1 to the metal of the dithiocarbamate to be stabilized is 0.2–15%.

7. A new composition of matter comprising metal ethylene bis-dithiocarbamate of a metal selected from the group of iron, manganese and zinc stabilized by a cuprous ethylene bis-dithiocarbamate.

References Cited

UNITED STATES PATENTS 2,944,073   7/1960   Vesterman et al. ___ 260—438.1

HELEN M. McCARTHY, Primary Examiner

A. P. DEMERS, Assistant Examiner

U.S. Cl. X.R.

252—400; 260—429.9, 438.1